(No Model.)

S. H. WILLIAMS.
CORN PLANTER.

No. 262,336. Patented Aug. 8, 1882.

Witnesses:
J. W. Garner
W. S. D. Haines

Inventor
S. H. Williams
By H. H. Ennis
Atty.

UNITED STATES PATENT OFFICE.

SION H. WILLIAMS, OF WILSONVILLE, TENNESSEE.

CORN-PLANTER.

SPECIFICATION forming part of Letters Patent No. 262,336, dated August 8, 1882.

Application filed March 23, 1881. (No model.)

*To all whom it may concern:*

Be it known that I, SION H. WILLIAMS, a citizen of the United States, residing at Wilsonville, in the county of Obion and State of Tennessee, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to corn-planters; and it consists in the construction and arrangement of parts, as hereinafter more fully described and claimed.

Figure 1:
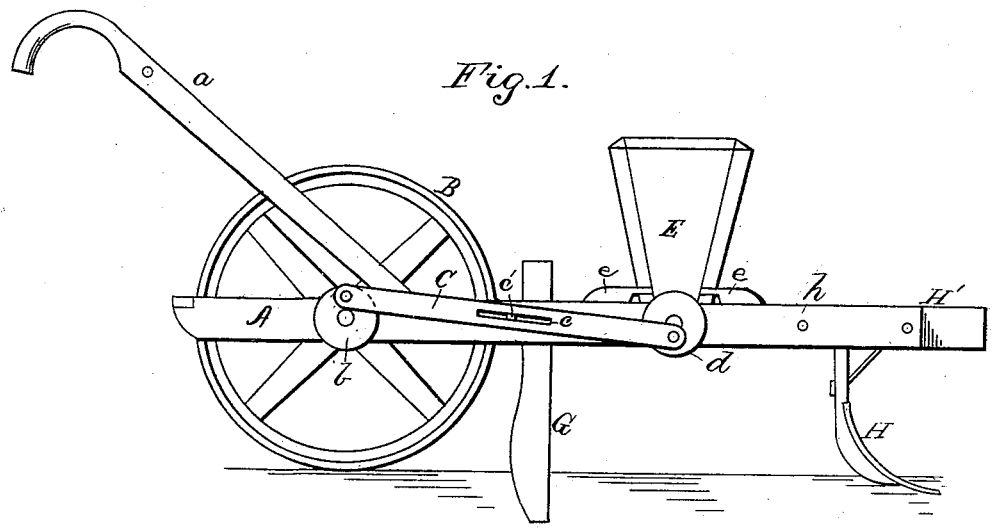
Figure 2:
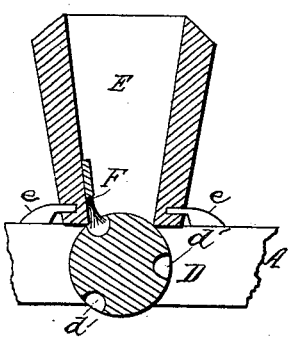
Figure 3:
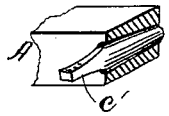

In the annexed drawings, Figure 1 is a side view. Fig. 2 is a vertical section, and Fig. 3 is a detail.

A is the frame of the machine, and is provided at its rear end with handles $a\ a$. In the frame A is journaled the driving-wheel B, which has a broad tire. On the same shaft or axle with the wheel B is a crank-wheel, $b$, that connects by the pitman C with a crank-wheel, $d$, on the end of the shaft that carries the seed-cylinder D.

The pitman C is provided near the center with an elongated rectangular slot, $c$, that engages with a beveled guide-pin, $c'$, the cylindrical end of which is secured in an aperture in the side of the frame A. This pin $c'$ is beveled or tapering and fits into a corresponding recess in the frame A, and as the pitman C is operated the pin $c'$ oscillates in its bearing. This simple mechanical motion insures a rotation of the seed-cylinder D, and effectually obviates the tendency to stick at the dead-center. By this means the cylinder D is revolved backward as the planter advances.

A seed-box, E, is detachably secured to the frame A, above the cylinder D, by means of the buttons or catches $e\ e$, that enter slots or recesses in the corner of the box. In the interior of the box E, on its rear side and near the bottom, is a brush, F, that regulates the feed of the corn to the seed-cups $d'$ in the cylinder D. These seed-cups may be of any desired number or size, and are arranged at such distances apart that the corn will be dropped at proper intervals.

To each side of the frame A, between the driving-wheel and seed-box, is attached a cover, G, that may be adjusted to the required height, and at the forward end of this frame is secured a plow, H, for opening a furrow to receive the seed. The plow H is attached to a frame, H', that is pivoted at $h$ in such a manner that the plow may be adjusted at any desired angle or entirely raised from the ground, if required.

After the seed has been dropped it is covered by the action of the coverers G G, the faces of which are inclined inward toward each other, and the broad tire of the wheel B, passing over the covered seed, breaks the clods and leaves the soil smooth.

The machine is simple and efficient in operation. It may be drawn by a single animal, and is readily managed by one person.

I am aware that seed-planters have been used in which the seed-cylinder has been operated by one or more levers connected to the driving-wheel, and such device I do not broadly claim.

Having thus described my invention, what I claim as new, and desire to secure by Letters Patent, is—

The combination of the frame A, wheel B, pitman C, provided with slot $c$, crank-wheels $b\ d$, seed-cylinder D, and the oscillating taper-pin $c'$, the whole constructed and operating substantially as and for the purpose set forth.

In testimony whereof I affix my signature in presence of two witnesses.

SION H. WILLIAMS.

Witnesses:
J. L. HORNBEAK,
J. W. CURRY.